United States Patent
Rohrig et al.

(10) Patent No.: US 11,951,516 B2
(45) Date of Patent: Apr. 9, 2024

(54) MULTI-STAGE CLEANING OF SPACE SUIT (71) Applicant: Hamilton Sundstrand Corporation, Charlotte, NC (US)

(72) Inventors: Jake Rohrig, Simsbury, CT (US); Julie Strickland, Houston, TX (US); Samuel Anderson, Houston, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 635 days.

(21) Appl. No.: 17/142,468

(22) Filed: Jan. 6, 2021

(65) Prior Publication Data

US 2022/0212236 A1 Jul. 7, 2022

(51) Int. Cl.
| | | |
|---|---|---|
| *B08B 7/04* | (2006.01) | |
| *B08B 3/02* | (2006.01) | |
| *B08B 5/02* | (2006.01) | |
| *B08B 7/00* | (2006.01) | |
| *B08B 13/00* | (2006.01) | |
| *B08B 15/02* | (2006.01) | |
| *B64G 1/60* | (2006.01) | |

(52) U.S. Cl.
CPC ............... *B08B 7/04* (2013.01); *B08B 3/026* (2013.01); *B08B 5/02* (2013.01); *B08B 7/0035* (2013.01); *B08B 13/00* (2013.01); *B08B 15/02* (2013.01); *B64G 1/60* (2013.01)

(58) Field of Classification Search
None
See application file for complete search history.

(56) References Cited

U.S. PATENT DOCUMENTS

| 3,158,457 A | 11/1964 | Whitfield |
| 3,616,624 A | 11/1971 | Marsh |
| 4,842,224 A | 6/1989 | Cohen |

(Continued)

FOREIGN PATENT DOCUMENTS

| CN | 106248573 A | 12/2016 |
| CN | 107942749 A | 4/2018 |

(Continued)

OTHER PUBLICATIONS

JP2014181858 English translation, accessed on Aug. 2023. (Year: 2014).*

(Continued)

*Primary Examiner* — Eric W Golightly
*Assistant Examiner* — Arlyn I Rivera-Cordero
(74) *Attorney, Agent, or Firm* — CANTOR COLBURN LLP (57) ABSTRACT

A system to perform multi-stage cleaning of material from a space suit worn by an astronaut in a deep space environment includes one or more discharge units installed external to an interior volume of a facility in the deep space environment. Each of the one or more discharge units releases one or more substances. The one or more substances includes water or air and the interior volume of the facility is defined by an interior hatch that is separated from an exterior hatch leading to the deep space environment by an airlock. One or more collection units installed external to the interior volume. Each collection unit traps released material that is released from a space suit based on the multi-stage cleaning to prevent the released material from entering the interior volume.

16 Claims, 7 Drawing Sheets

(56) References Cited

U.S. PATENT DOCUMENTS

| | | | |
|---|---|---|---|
| 5,993,521 | A | 11/1999 | Loreth et al. |
| 6,076,216 | A | 6/2000 | Biryukov |
| 6,740,144 | B2 | 5/2004 | Conrad et al. |
| 7,074,261 | B2 | 7/2006 | Murphy |
| 9,040,008 | B2 | 5/2015 | Zahedi |
| 9,849,463 | B2 | 12/2017 | Peczalski et al. |
| 2002/0134399 | A1 | 9/2002 | Taylor |
| 2008/0060101 | A1 | 3/2008 | Cadogan |

FOREIGN PATENT DOCUMENTS

| | | | | |
|---|---|---|---|---|
| CN | 211707583 | * | 10/2020 | ............... B08B 5/02 |
| JP | 2013221649 | * | 10/2013 | |
| JP | 2014181858 | * | 9/2014 | ................ F24F 9/00 |
| JP | 2018115827 | * | 7/2018 | ................ F24F 7/06 |
| KR | 101571157 | * | 11/2015 | ................ B08B 5/02 |

OTHER PUBLICATIONS

JP2013221649 English translation, accessed on Aug. 2023. (Year: 2013).*

KR101571157 English translation, accessed on Aug. 2023. (Year: 2015).*

JP2018115827 English translation, accessed on Aug. 2023. (Year: 2018).*

CN 211707583 English translation, accessed on Aug. 2023. (Year: 2020).*

Agui et al., "NASA Lunar Dust Filtration and Separations Workshop Report", XP055885554, Dec. 1, 2009, pp. 1-33, retrieved from the internet: https://ntrs.nasa.gov/api/citations/20100004823/downloads/20100004823.pdf.

Cain, John R. "Lunar Dust: The Hazard and Astronaut Exposure Risks", Earth Moon, and Planets, 2010, pp. 107-125.

Extended European Search Report for EP Application No. 21218111.9, dated May 13, 2022, pp. 1-10.

Hoffman, Stephen J., "Advanced EVA Capabilities: A Study for NASA's Revolutionary Aerospace Systems Concept Program", NASA/TP, Apr. 1, 2004, pp. 1-165, retrieved from the Internet: https://ston.jsc.nasa.gov/collections/trs/_techrep/TP-2004-212068.pdf.

* cited by examiner

MULTI-STAGE CLEANING OF SPACE SUIT

BACKGROUND

Exemplary embodiments pertain to the art of space exploration and, in particular, to multi-stage cleaning of a space suit.

Extravehicular activity on the surface of a planet refers to activity outside of a space vehicle, habitat, or other facilities that provide a habitable environment without the need for each astronaut to wear an individual space suit with life support capability. When entering such a facility, the astronauts must ensure that dust or any other planetary material are not introduced into the facility. Such foreign material may negatively affect both the vehicle components and the crew members. For example, lunar dust has been found to cause scar tissue in lungs and may be linked with brain cancer, and Martian dust has been found to be toxic.

BRIEF DESCRIPTION

In one embodiment, a system to perform multi-stage cleaning of material from a space suit worn by an astronaut in a deep space environment includes one or more discharge units installed external to an interior volume of a facility in the deep space environment. Each of the one or more discharge units releases one or more substances. The one or more substances includes water or air and the interior volume of the facility is defined by an interior hatch that is separated from an exterior hatch leading to the deep space environment by an airlock. The system also includes one or more collection units installed external to the interior volume. Each collection unit traps released material that is released from a space suit based on the multi-stage cleaning to prevent the released material from entering the interior volume.

Additionally or alternatively, in this or other embodiments, the one or more discharge units releases air to blow off the material from the space suit in a first stage of the multi-stage cleaning, releases water to clean off remaining material from the space suit in a second stage of the multi-stage cleaning, releases air to dry off the space suit in a third stage of the multi-stage cleaning, and releases wax to coat the space suit in a fourth stage of the multi-stage cleaning.

Additionally or alternatively, in this or other embodiments, the one or more discharge units releases positively and negatively charged ions to neutralize the material on the space suit in a first stage of the multi-stage cleaning, releases water to clean off remaining material from the space suit in a second stage of the multi-stage cleaning, releases air to dry off the space suit in a third stage of the multi-stage cleaning, and releases wax to coat the space suit in a fourth stage of the multi-stage cleaning.

Additionally or alternatively, in this or other embodiments, the material is planetary or lunar dust.

Additionally or alternatively, in this or other embodiments, the system is located in the airlock between the interior hatch and the exterior hatch of the facility and the facility is a space vehicle or a habitat.

Additionally or alternatively, in this or other embodiments, the system also includes a filter in a space between a raised platform with openings on which the astronaut stands and the floor of the airlock.

Additionally or alternatively, in this or other embodiments, one of the discharge units is installed in a ring-shaped support whose opening is sized to encircle the astronaut.

Additionally or alternatively, in this or other embodiments, the ring-shaped support moves up and down.

Additionally or alternatively, in this or other embodiments, one of the discharge units is installed on a swing arm or robotic arm to move around the space suit.

Additionally or alternatively, in this or other embodiments, the system is located external to the exterior hatch of the facility, and one of the discharge units releases carbon dioxide waste that is reclaimed from the interior volume.

Additionally or alternatively, in this or other embodiments, one of the one or more discharge units is a hand-held unit that is located in the airlock or outside the facility.

Additionally or alternatively, in this or other embodiments, the system also includes an additional set of one or more discharge units arranged in the airlock adjacent to the interior hatch. The additional set of one or more discharge units releases air when the interior hatch is open so that the released material in the airlock does not enter the interior volume.

Additionally or alternatively, in this or other embodiments, the system also includes a controller controls a duration of the release of the one or more substances.

Additionally or alternatively, in this or other embodiments, the controller controls the duration based on a manual input or based on an automated determination of an amount of the material on the space suit.

In another embodiment, a method of assembling a system to perform multi-stage cleaning of material from a space suit worn by an astronaut in a deep space environment includes installing one or more discharge units external to an interior volume of a facility in the deep space environment. Each of the one or more discharge units releases one or more substances. The one or more substances includes water or air and the interior volume of the facility is defined by an interior hatch that is separated from an exterior hatch leading to the deep space environment by an airlock. The method also includes installing one or more collection units external to the interior volume. Each collection unit traps released material that is released from a space suit based on the multi-stage cleaning to prevent the released material from entering the interior volume.

Additionally or alternatively, in this or other embodiments, the installing the one or more discharge units includes configuring the one or more discharge units to release air to blow off the material from the space suit in a first stage of the multi-stage cleaning, to release water to clean off remaining material from the space suit in a second stage of the multi-stage cleaning, to release air to dry off the space suit in a third stage of the multi-stage cleaning, and to release wax to coat the space suit in a fourth stage of the multi-stage cleaning.

Additionally or alternatively, in this or other embodiments, the installing the one or more discharge units includes configuring the one or more discharge units to release positively and negatively charged ions to neutralize the material on the space suit in a first stage of the multi-stage cleaning, to release water to clean off remaining material from the space suit in a second stage of the multi-stage cleaning, to release air to dry off the space suit in a third stage of the multi-stage cleaning, and to release wax to coat the space suit in a fourth stage of the multi-stage cleaning.

Additionally or alternatively, in this or other embodiments, the installing the one or more discharge units is in the airlock between the interior hatch and the exterior hatch of the facility or external to the exterior hatch of the facility, and the facility is a space vehicle or a habitat.

Additionally or alternatively, in this or other embodiments, the method also includes configuring a controller to control a duration of the release of the one or more substances.

Additionally or alternatively, in this or other embodiments, the configuring the controller includes configuring the controller to control the duration based on a manual input or based on an automated determination of an amount of the material on the space suit.

BRIEF DESCRIPTION OF THE DRAWINGS

The following descriptions should not be considered limiting in any way. With reference to the accompanying drawings, like elements are numbered alike:

FIGS. 7A-7D show exemplary embodiments of substances released to perform multi-stage cleaning of a space suit in a deep space environment according to one or more embodiments, in which:

DETAILED DESCRIPTION

A detailed description of one or more embodiments of the disclosed apparatus and method are presented herein by way of exemplification and not limitation with reference to the Figures.

In deep space exploration or habitation, an astronaut travels between a planetary environment that requires the astronaut to wear a space suit for life support and a habitable facility that includes life support systems and, thus, allows the astronaut to remove the space suit. Generally, the habitable facility incudes an airlock, which is a space between an exterior hatch leading outside to a planetary surface and an interior hatch leading into the habitable volume. Embodiments of the systems and methods detailed herein relate to multi-stage cleaning of a space suit (e.g., extravehicular mobility unit (EMU)). As previously noted, dust and other materials (e.g., pollen, alien life forms) present dangers for the equipment and personnel in the habitable facility. Thus, the cleaning of the space suit must be completed prior to the astronaut entering the habitable facility (e.g., space vehicle, habitat) via the interior hatch of the airlock.

Figure 1:
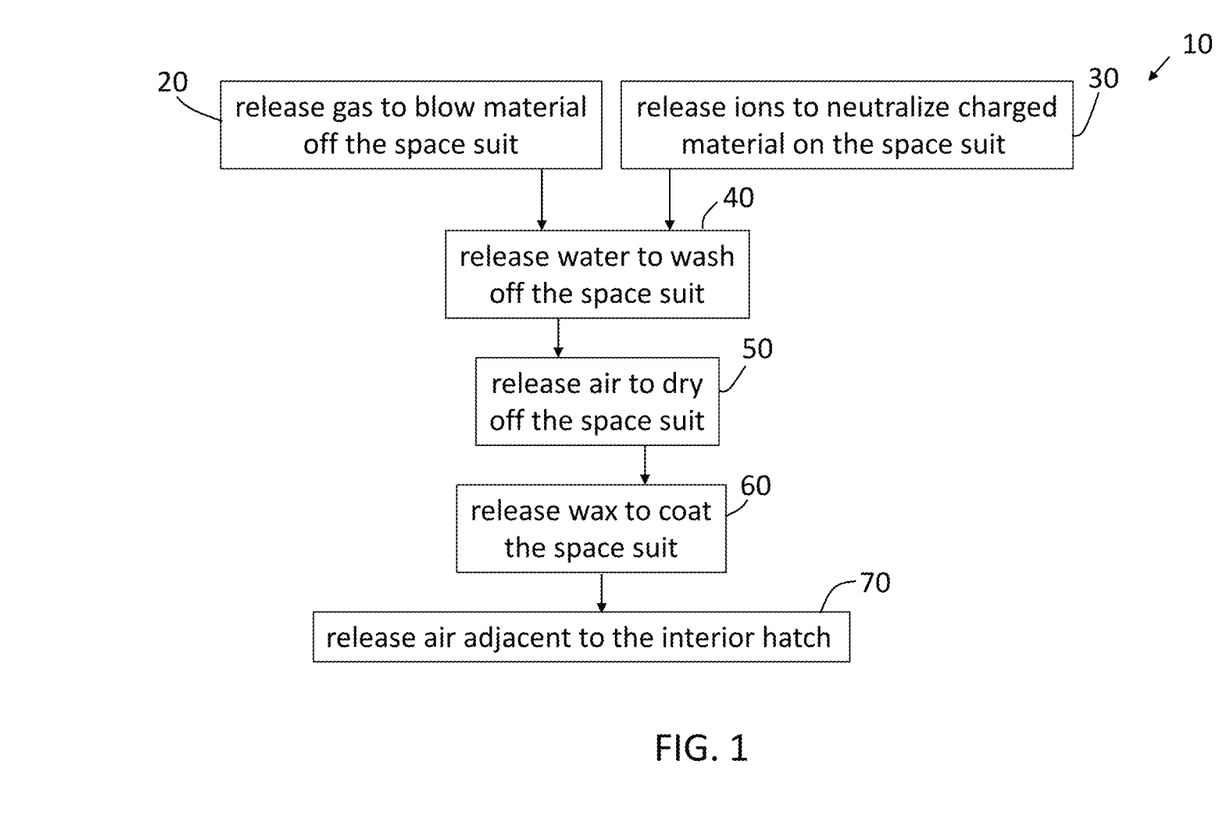
FIG. 1 is a process flow of a method of performing multi-stage cleaning of a space suit in a deep space environment according to one or more embodiments.

FIG. 1 is a process flow of a method 10 of performing multi-stage cleaning of a space suit 120 (FIG. 2) in a deep space environment according to one or more embodiments. Different substances 135 (FIG. 2) are released at each of the stages to clear away material 110 (FIG. 2) from the space suit. As shown more clearly in FIG. 6, the airlock 105 is a space between an exterior hatch 620 leading outside to a surface 605 of a celestial body (e.g., Moon, Mars) and an interior hatch 630 leading into the interior volume 610 of the facility 600 (e.g., space vehicle, habitat). All of the stages of the multi-stage cleaning may be performed in the airlock 105 or, alternately, one or more stages may be performed outside prior to the astronaut entering the airlock 105.

For example, at block 20, the release of gas 730 (FIG. 7B) may be performed outside the airlock 105. In this case, the gas 730 may be waste $CO_2$ from the interior volume 610 that may be released at a flow rate that facilitates blowing off material 110 from the space suit 120. Alternately, the release of gas 730, at block 20, may be performed in the airlock 105. When the airlock 105 is first entered, it is essentially a vacuum which is then filled with gases (e.g., oxygen $O_2$, nitrogen $N_2$, carbon dioxide $CO_2$). According to one or more embodiments, this inflow of these gases may be used to perform the first stage (block 20). For example, air may be the gas 730 released in the airlock 105 via one or more discharge units 130 (FIG. 2) to blow material 110 off the space suit 120. Alternately or additionally, inflow of some or all of the gases 730 may be through an electric field to generate the ions (cations 710 and anions 720 (FIG. 7A)) released via one or more discharge units 130 (at block 30). When the material 110 on the space suit 120 is charged (e.g., lunar dust), this release of ions 710, 720 (at block 30) neutralizes the charged material 110 so that it falls off the space suit 120 as released material 115 (FIG. 2).

At block 40, releasing water 740 (FIG. 7C) from one or more discharge units 130 washes off the space suit 120 as a next stage in the multi-stage cleaning. The temperature of the water 740 may be high enough to wash off a coating of wax 750 (FIG. 7) from the space suit 120. At block 50, releasing air (or another gas 730) from one or more discharge units 130 dries off the space suit 120 and also blows off any material 110 that remains on the space suit 120 mixed with the water 740. At block 60, releasing wax 750 to coat the space suit 120 ensures that any wax 750 removed by the wash at block 40 is replaced. The wax 750 may be a polymer-based wax, for example, and may prevent or reduce adhesion of the material 110 on the space suit 120.

At block 70, the processes include releasing air (or another gas 730) adjacent to the interior hatch 630 leading into the interior volume 610 from the air lock 105. This release of air may be by different discharge units 130 than those used in other processes. This is illustrated in FIG. 6, for example. This release of air ensures that material 110 lingering in the air lock 105 does not make its way into the interior volume 610 when the interior hatch 630 is opened. As further discussed, the duration of each stage and other features of the multi-stage cleaning may be controlled. Different exemplary embodiments for the discharge units 130 and for collection of the released material 115 that results from the various stages of removing the material 110 from the space suit 120 are discussed with reference to FIGS. 2-7.

Figure 2:
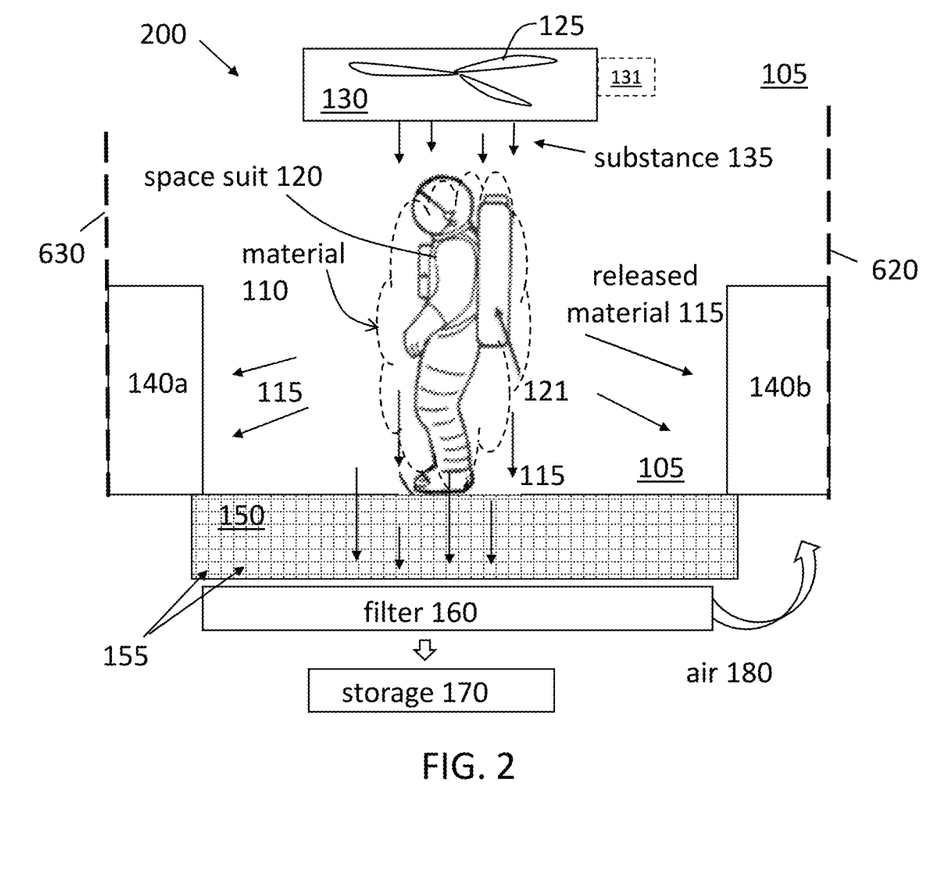
FIG. 2 shows an exemplary system to perform multi-stage cleaning of a space suit in a deep space environment according to one or more embodiments.

FIG. 2 shows an exemplary system 200 to perform multi-stage cleaning of a space suit 120 in a deep space environment according to one or more embodiments. The exemplary system 200 may be in an airlock 105, as indicated in the exemplary case of FIG. 2, or outside of a facility 600 (FIG. 6). According to alternate embodiments, the facility 600 may be a space vehicle or habitat in a deep environment. An astronaut wearing an exemplary space suit 120 is shown in the airlock 105. An exemplary space suit 120 may be an EMU, an exploration EMU (xEMU), or a Mars EMU (mEMU). As indicated, the space suit 120 may include a pack 121 with oxygen tanks and power systems, boots, and a helmet in addition to a full body suit. Material 110 (e.g., dust) is indicated on and around the space suit 120. For example, negatively and/or positively charged dust may have become attached to the space suit 120 during extravehicular activity on the surface 605 of the celestial body (e.g., Moon, Mars). The system 200 ensures that the dust and any other material 110 that adhered to the space suit 120 is removed and captured so that it does not make its way into the interior volume 610 of the facility 600 when the interior hatch 630 is opened to allow the astronaut to enter.

According to the exemplary embodiment shown in FIG. 2, a discharge unit 130 may be disposed in a ceiling of the airlock 105, for example. As indicated, a discharge unit 130 may include multiple outlets. The number and placement of discharge units 130 is not intended to be limited by this exemplary illustration. Further, each discharge unit 130 may release a different substance 135 or each discharge unit 130 may release more than one type of substance 135 in turn. For example, discharge units 130 may be located on the sides above the collection units 140a, 140b (generally referred to as 140). Additional alternate exemplary embodiments are discussed with reference to FIGS. 3-6.

A controller 131 is shown coupled to the exemplary discharge unit 130 but the placement of the controller 131 is not limited by this exemplary arrangement. The controller 131 may control the duration of each of the stages in the multi-stage cleaning process. That is, the controller 131 may control the duration of release of each of the substances 135. According to an exemplary embodiment, the basis for this control may be manual (i.e., based on an input from an astronaut). That is, the astronaut may assess the level of cleaning needed and either select a specific duration or select a cleaning level (e.g., light, medium, heavy) that maps to a duration for each stage of the multiple stages of cleaning.

According to another exemplary embodiment, the basis for the control may be automatic. A determination of the amount of material 110 on the space suit 120 may be made. For example, this determination may be based on image processing of an image obtained of the space suit 120 or on the weight of the astronaut before and after the extravehicular activity (while accounting for oxygen use affecting the weight of the pack 121). The determination of the amount of material 110 may then be used to control the duration of each stage in the multi-stage cleaning. The assessment may also be between stages. Thus, for example, the release of water 740 (at block 40) may be for a longer duration than standard based on an assessment of remaining material 110 after the release of ions 710, 720 (at block 30). Other features of the multi-stage cleaning that may be controlled include the temperature of the water 740 released at block 40 and the flow rate of different substances 135.

As more clearly shown in FIG. 6, the astronaut stands on a platform 150 that is raised above the floor 627 of the airlock 105, thereby creating a space 625 below the platform 150 and the floor 627. The platform 150 may be a grating or other surface with openings 155. The released material 115 cleaned from the space suit 120 may fall through the openings 155 in the platform 150. A filter 160 below the platform 150 (i.e., in the space 625) may catch the dust particles or other particles in the release materials 115, as well as the substances 135 released for purposes of cleaning at the different stages.

Between stages, the filter 160 may be covered for protection based on the substance 135 being used in the next stage. For example, prior to releasing water 740 (FIG. 7) or wax 750 (FIG. 7), the filter 160 may be covered or moved. Alternately, the filter 160 may operate in both wet and dry conditions. Following a stage in which gas 730 (at block 20) or ions 710, 720 (at block 30) are released, the released material 115 that is blown off or neutralized on the space suit 120 and caught in the filter 160 may be released to be collected in storage 170. Further, the filtered air 180 that is free of the released material 115 is recirculated. The particles in storage 170 may ultimately be disposed of or retained for analysis. Alternately, the particles may be routed through the waste management system so that water may be reclaimed.

In addition to falling through the platform 150, released materials 115 may be trapped by one or more collection units 140. While two collection units 140a, 140b are shown on opposite sides of the airlock 105 in FIG. 2, the exemplary number and arrangement of the collection units 140 is not intended to be limiting. One or more collection units 140 may be placed below the platform 150 along with the filter 160, for example. Other embodiments are discussed with reference to FIGS. 4-6.

Figure 3:
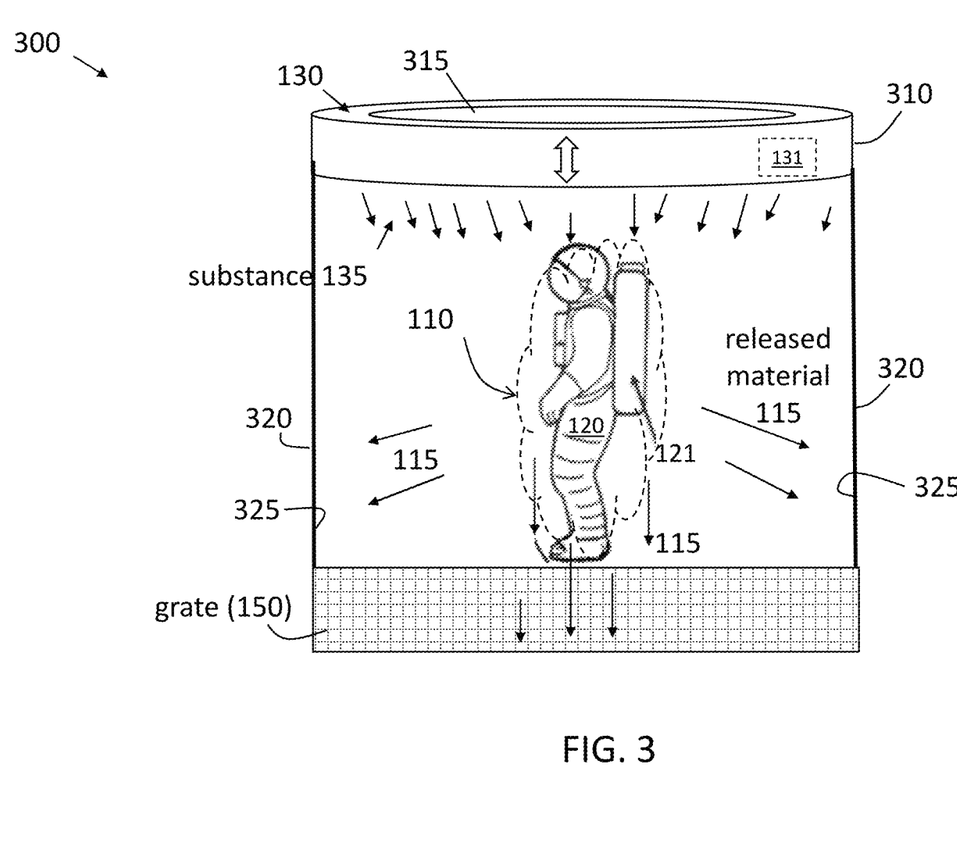
FIG. 3 is an exemplary embodiment of a system to perform multi-stage cleaning of a space suit in a deep space environment according to one or more embodiments.

FIG. 3 is an exemplary embodiment of a system 300 to perform multi-stage cleaning of a space suit 120 in a deep space environment according to one or more embodiments. As shown a ring-shaped support 310 includes one or more discharge units 130. One discharge unit 130 may span the circumference of the ring-shaped support 310 or multiple discharge units 130 may be disposed around the ring-shaped support 310. According to a further exemplary embodiment, the ring-shaped support 310 that holds one or more discharge units 130 may move up and down. As shown, the ring-shaped support 310 is sized such that an opening 315 accommodates the astronaut. The ring-shaped support 310 may be supported on opposite-side walls 320 of the airlock 105, for example. The ring-shaped support 310 may be supported on tracks 325 such that it moves down the walls 320 along the length of the space suit 120 to emit the substances 135 along the length of the space suit 120. While not shown, one or more collection units 140 and the filter 160 may be present, as shown in FIG. 1, for example.

Figure 4:
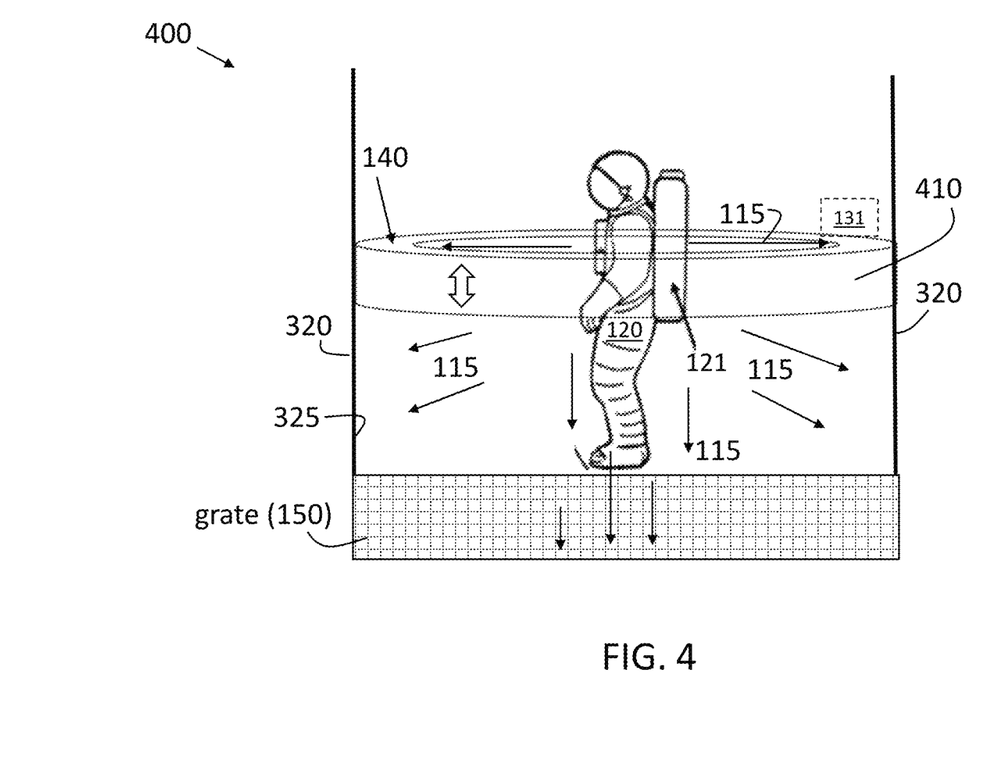
FIG. 4 is an exemplary embodiment of a system to perform multi-stage cleaning of a space suit in a deep space environment according to one or more embodiments.

FIG. 4 is an exemplary embodiment of a system 400 to perform multi-stage cleaning of a space suit 120 in a deep space environment according to one or more embodiments. As shown in FIG. 4, a ring-shaped support 410 may be supported on opposite-side walls 320 of the airlock 105, for example. The ring-shaped support 410 may include one or more collection units 140 and may be mounted on tracks 325 to move up and down along the walls 320. The ring-shaped support 410 may be additional to the ring-shaped support 310 shown in FIG. 3. That is, both a stationary ring-shaped support 310 and a moveable ring-shaped support 410 may be mounted to release different substances 135 or the same substances 135 at the different stages.

Figure 5:
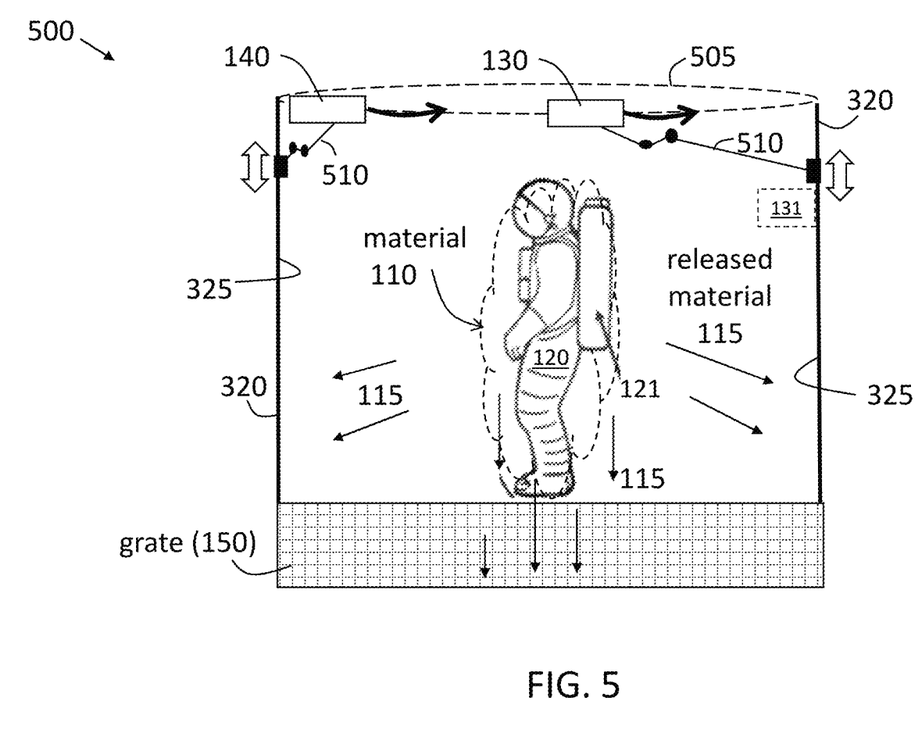
FIG. 5 is an exemplary embodiment of a system to perform multi-stage cleaning of a space suit in a deep space environment according to one or more embodiments.
Figure 6:
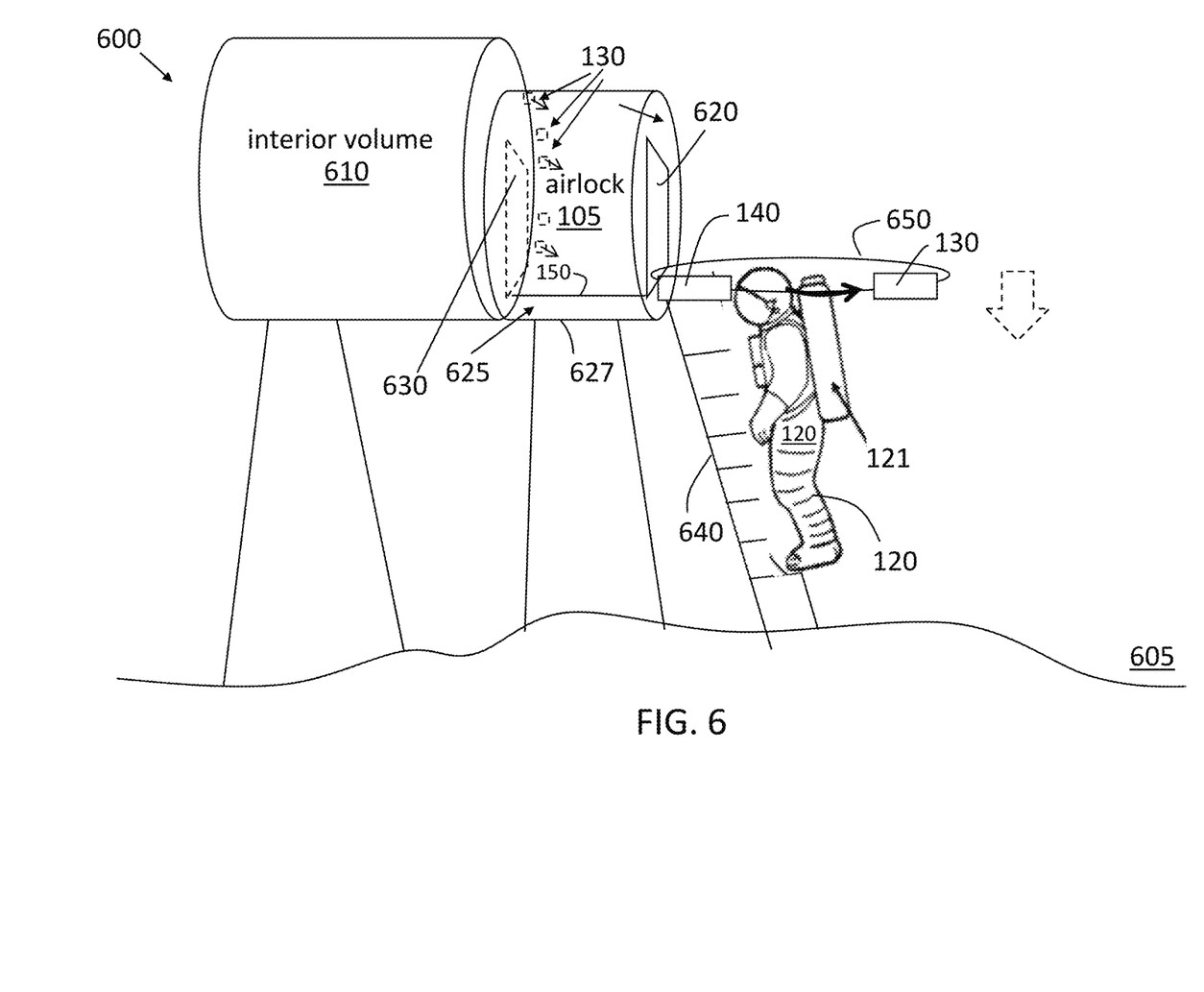
FIG. 6 shows relevant aspects of an exemplary facility including a system to perform multi-stage cleaning of a space suit in a deep space environment according to one or more embodiments.

FIG. 5 is an exemplary embodiment of a system 500 to perform multi-stage cleaning of a space suit 120 in a deep space environment according to one or more embodiments. Two mechanical arms 510 (e.g., swing arm, robotic arm) are shown affixed to the walls 320 of the airlock 105, for example. One mechanical arm 510 is shown supporting a discharge unit 130 and the other is shown supporting a collection unit 140. A circular path 505 is shown for both the discharge unit 130 and the collection unit 140 based on movement of the mechanical arms 510. According to additional embodiments, the mechanical arms 510 may move along tracks 325 mounted on the walls 320 to move the discharge unit 130 and the collection unit 140 up and down. While both the discharge unit 130 and the collection unit 140 are shown supported by mechanical arms 510, only one mechanical arm 510 may support the discharge unit 130 or the collection unit 140. Alternately, multiple mechanical arms 510 may support multiple discharge units 130 or multiple mechanical arms 510 may support multiple collection units 140.

FIG. 6 shows relevant aspects of an exemplary facility 600 including multi-stage cleaning of a space suit 120 in a deep space environment according to one or more embodiments. As previously noted, the facility 600 may be a space vehicle or habitat on another plant. An airlock 105 is shown between an interior hatch 630 leading into the interior volume 610 and an exterior hatch 620 leading outside the facility 600. Discharge units 130 are shown adjacent to the interior hatch 630. These discharge units 130 may be among those that form the air curtain used at block 70. That is, the discharge units 130 may release air (or another gas 730) to ensure that material 110 does not enter the interior volume 610 from the airlock 105 when the interior hatch 630 is opened. As indicated by the arrows, the output from the discharge units 130 may be directed into the airlock 105 in order to ensure that any remaining material 110 or released material 115 is blown into the airlock 105 rather than being allowed into the interior volume 610.

A ladder 640 is shown to provide access to the exterior hatch 620 from the surface 605. The platform 150 and the space 625 between it and the floor 627 are indicated. According to the exemplary embodiment shown in FIG. 6, a discharge unit 130 and a collection unit 140 may be affixed to a track 650 affixed to the ladder 640. According to alternate embodiments, any of the exemplary systems 300, 400, 500 may be implemented at the ladder 640 to remove material 110 prior to the astronaut reaching the exterior hatch 620. That is, some or all of the processes discussed for blocks 20, 30, 40, 50, and 60 may be performed outside the airlock 105. In this case, the discharge units 130 shown in the airlock 105 are used only at block 70. Alternately, additional discharge units 130 according to any of the previously discussed embodiments may be used in the airlock 105 to implement the processes at block 20, 30, 40, 50, or 60.

According to further embodiments, some of the stages of the cleaning (i.e., release of some of the substances 135) may be performed outside the facility 600 (i.e., outside the exterior hatch 620) while other stages of the cleaning (e.g., release of other substances 135) may be performed within the airlock 105. For example, an initial stage described at block 20 or 30 may be performed outside. Once the astronaut enters the airlock 105, the stage described at blocks 40, 50, 60, and 70 may be performed in turn. Unlike the embodiments shown in the airlock 105, any system affixed to the ladder 640 may be part of a temporary setup. For example, when the facility 600 is a space vehicle, the ladder 640 and any attachments must be removed prior to leaving the planetary surface 605. When the facility 600 is a habitat, both the outside and inside cleaning setups may fixed.

FIGS. 7A-7D show exemplary substances 135 released to perform multi-stage cleaning of a space suit 120 in a deep space environment according to one or more embodiments. In addition, the figures show an additional or alternate discharge unit 130 that is hand-held. One or more hand-held discharge units 130 may be located outside, inside, or both outside and inside the airlock 105. When the same hand-held discharge unit 130 releases different substances 135 at different stages, the substance 135 being released by the hand-held discharge unit 130 (i.e., stage of cleaning) may be changed automatically or manually. The manual change of substances 135 facilitates manual control over the duration of each stage of the cleaning even without a controller 131 that obtains inputs.

Figure 7A:
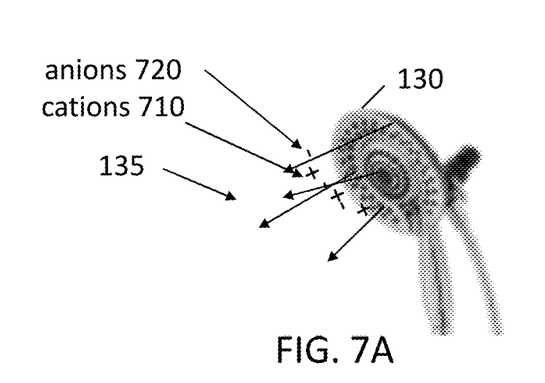
FIG. 7A shows the release of cations and anions.
Figure 7B:
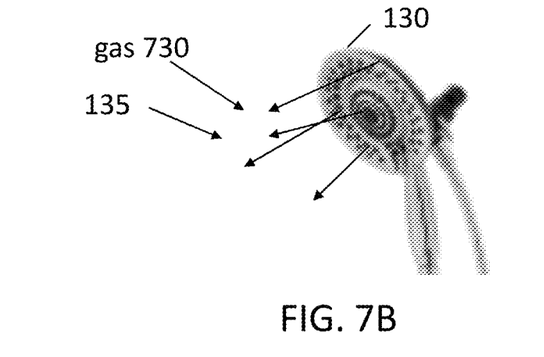
FIG. 7B shows the release of gas.
Figure 7C:
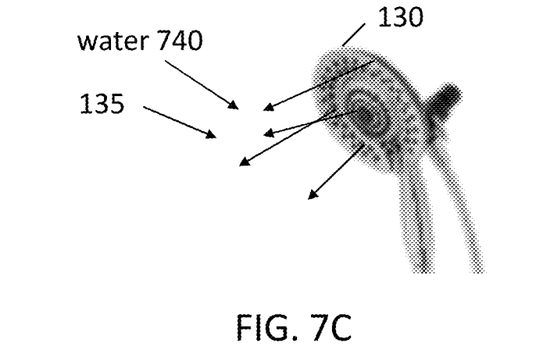
FIG. 7C shows the release of water.
Figure 7D:
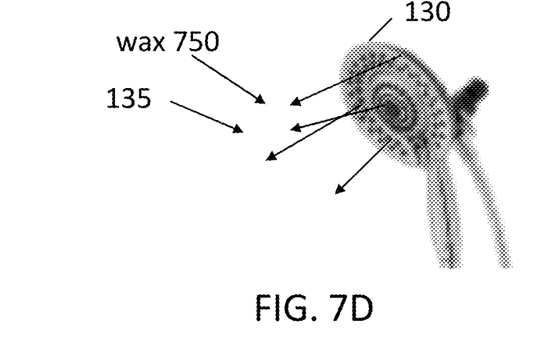
FIG. 7D shows the release of wax.

FIG. 7A shows release of cations 710 and anions 720 from a discharge unit 130 (at block 30) to neutralize charged dust or other charged material 110 on the space suit 120. FIG. 7B shows release of gas 730 from a discharge unit 130 (at block 20) to blow off material 110 from the space suit 120. As previously noted, this gas 730 may be air (e.g., block 20 in the airlock 105, blocks 50 and 70) or $CO_2$ (e.g., block 20 outside the airlock 105). FIG. 7C shows the release of water 740 (at block 40) to wash off material 110 from the space suit 120. As previously noted, the water 740 may be hot enough to melt and wash off a coating of wax 750 applied to the space suit 120 to mitigate the adhesion of materials 110. FIG. 7D shows the release of wax 750 (at block 60). As previously noted, according to exemplary embodiments, all of the substances 135 may be released at different stages through the same one or more discharge units 130. According to alternate embodiments, each of the substances 135 may be released by a different discharge unit 130. Each discharge unit 130 may include nozzles or other flow control devices to disperse the released substances 135.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of assembling a system to perform multi-stage cleaning of material from a space suit worn by an astronaut in a deep space environment, the method comprising:

installing one or more discharge units external to an interior volume of a facility in the deep space environment, each of the one or more discharge units configured to release one or more substances, wherein the one or more substances includes water or air and the interior volume of the facility is defined by an interior hatch that is separated from an exterior hatch leading to the deep space environment by an airlock; and installing one or more collection units external to the interior volume, each collection unit being configured to trap released material that is released from a space suit based on the multi-stage cleaning to prevent the released material from entering the interior volume;

wherein the installing the one or more discharge units includes configuring the one or more discharge units to release air to blow off the material from the space suit or to release positively and negatively charged ions to neutralize the material on the space suit in a first stage of the multi-stage cleaning, to release water to clean off remaining material from the space suit in a second stage of the multi-stage cleaning, to release air to dry off the space suit in a third stage of the multi-stage cleaning, and to release wax to coat the space suit in a fourth stage of the multi-stage cleaning.

2. The method according to claim 1, wherein the installing the one or more discharge units is in the airlock between the interior hatch and the exterior hatch of the facility or external to the exterior hatch of the facility, and the facility is a space vehicle or a habitat.

3. The method according to claim 1, further comprising configuring a controller to control a duration of the release of the one or more substances.

4. The method according to claim 3, wherein the configuring the controller includes configuring the controller to control the duration based on a manual input or based on an automated determination of an amount of the material on the space suit.

5. A system to perform multi-stage cleaning of material from a space suit worn by an astronaut in a deep space environment, the system comprising:

one or more discharge units installed external to an interior volume of a facility in the deep space environment, each of the one or more discharge units configured to release one or more substances, wherein the one or more substances includes water or air and the interior volume of the facility is defined by an interior hatch that is separated from an exterior hatch leading to the deep space environment by an airlock; and one or more collection units installed external to the interior volume, each collection unit being configured to trap released material that is released from a space suit based on the multi-stage cleaning to prevent the released material from entering the interior volume;

wherein the one or more discharge units are configured to release air to blow off the material from the space suit or to release positively and negatively charged ions to neutralize the material on the space suit in a first stage of the multi-stage cleaning, to release water to clean off remaining material from the space suit in a second stage of the multi-stage cleaning, to release air to dry off the space suit in a third stage of the multi-stage cleaning, and to release wax to coat the space suit in a fourth stage of the multi-stage cleaning.

6. The system according to claim 5, wherein the material is planetary or lunar dust.

7. The system according to claim 5, wherein the system is located external to the exterior hatch of the facility, and one of the discharge units is configured to release carbon dioxide waste that is reclaimed from the interior volume.

8. The system according to claim 5, wherein one of the one or more discharge units is a hand-held unit that is located in the airlock or outside the facility.

9. The system according to claim 5, further comprising an additional set of one or more discharge units arranged in the airlock adjacent to the interior hatch, wherein the additional set of one or more discharge units is configured to release air when the interior hatch is open so that the released material in the airlock does not enter the interior volume.

10. The system according to claim 5, further comprising a controller configured to control a duration of the release of the one or more substances.

11. The system according to claim 10, wherein the controller is configured to control the duration based on a manual input or based on an automated determination of an amount of the material on the space suit.

12. The system according to claim 5, wherein the system is located in the airlock between the interior hatch and the exterior hatch of the facility and the facility is a space vehicle or a habitat.

13. The system according to claim 12, further comprising a filter in a space between a raised platform with openings on which the astronaut stands and the floor of the airlock.

14. The system according to claim 12, wherein one of the discharge units is installed on a swing arm or robotic arm to move around the space suit.

15. The system according to claim 12, wherein one of the discharge units is installed in a ring-shaped support whose opening is sized to encircle the astronaut.

16. The system according to claim 15, wherein the ring-shaped support is configured to move up and down.

* * * * *